United States Patent [19]
Ito et al.

[11] Patent Number: 6,133,924
[45] Date of Patent: Oct. 17, 2000

[54] CALCULATOR

[75] Inventors: Matsutaka Ito, Yamatokoriyama; Michiaki Kuno, Kyoto; Miho Ohba, Yamatokoriyama, all of Japan

[73] Assignee: Sharp Kabushiki Kaisha, Osaka, Japan

[21] Appl. No.: 09/053,731

[22] Filed: Apr. 2, 1998

[30] Foreign Application Priority Data

Apr. 3, 1997 [JP] Japan ................................. 9-084787

[51] Int. Cl.[7] .................................................. G06T 11/20
[52] U.S. Cl. ......................................................... 345/440
[58] Field of Search .............................. 345/440; 708/160

[56] References Cited

U.S. PATENT DOCUMENTS

| | | | |
|---|---|---|---|
| 4,794,554 | 12/1988 | Tamiya ........................ | 708/160 |
| 5,535,317 | 7/1996 | Tanaka et al. ................. | 345/440 |
| 5,557,718 | 9/1996 | Tsuneyoshi et al. ........... | 345/440 |
| 5,586,060 | 12/1996 | Kuno et al. .................... | 364/554 |
| 5,712,656 | 1/1998 | Ikeda et al. .................... | 345/133 |
| 5,758,035 | 5/1998 | Tsuneyoshi .................... | 345/103 |

FOREIGN PATENT DOCUMENTS 62-186347   8/1987   Japan .

*Primary Examiner*—Mark R. Powell
*Assistant Examiner*—Motilewa Good-Johnson
*Attorney, Agent, or Firm*—Nixon & Vanderhye P.C.

[57] ABSTRACT

It is an object of the invention to solve problems with a calculator capable of displaying a graph of a function in that the characteristics of a graph displayed by inputting a function can not be recognized when a desired display range is not at an appropriate value and in that a value to change the display range has had to be input on a trial and error basis, which has made the operation very complicated. A calculator according to the invention displays a graph of a function on a reduced scale, further displays buttons for increasing and decreasing display ranges of an X-axis and a Y-axis around the graph and changes the graph of the function and displays it again in response to instructions by the user on the buttons. This makes it possible to correct the display ranges of the graph of the function easily.

9 Claims, 4 Drawing Sheets

CALCULATOR

BACKGROUND OF THE INVENTION

1. Field of the Invention

The present invention relates to a calculator capable of calculating a function and displaying a graph of the function.

2. Description of the Related Art

There are many conventional calculators capable of visually displaying a graph of a function. To display the graph of the function in such calculators, a user first inputs the function to be processed by the calculator. For example, assume the following Equations (1) and (2) as functions to be processed.

$$Y=X^2 \quad (1)$$

$$Y=2X+3 \quad (2)$$

The user instructs the calculator to display graphs of the functions. Upon the instruction, the calculator displays graphs of the functions in which the left and right ends of the display unit of the calculator corresponds to $X_{min}$ and $X_{max}$ of X-axis, and the lower and upper ends thereof corresponds to $Y_{min}$ and $Y_{max}$ of Y-axis, respectively. $X_{min}$ is a lower limit value of a display range of the X-axis of the graph, and $X_{max}$ is an upper limit value of the display range of the X-axis of the graph. $Y_{min}$ is a lower limit value of the display range of the Y-axis of the graph, and $Y_{max}$ is an upper limit value of the display range of the Y-axis of the graph. While each of $X_{min}$, $X_{max}$, $Y_{min}$ and $Y_{max}$ can be specified by a user, their initial values are preset for the time at which the calculator is used.

For example, $Y_{min}$, $X_{max}$, $Y_{min}$ and $Y_{max}$ are set at $X_{min}=-4.7$, $X_{max}=4.7$, $Y_{min}=-3.1$ and $Y_{max}=3.1$, respectively. For example, those numerical values are set such that "1" corresponds to 10 dots. Therefore, when the display unit is a display having, for example, 96 dots×64 dots, the graph is displayed using 31 dots allocated to each of regions above and below the X-axis and 47 dots allocated to each of regions to the left and right of the Y-axis.

However, even when the user wishes to have the graph of the functions displayed such that the relationship between the two functions as a whole can be properly understood from Equations (1) and (2):

$$Y=X^2 \quad (1)$$

$$Y=2X+3 \quad (2)$$

which represent the two functions, $X_{min}$, $X_{max}$, $Y_{min}$ and $Y_{max}$ may be values which have no relationship with the relationship between the two functions. Therefore, the graph of the functions displayed in the above-described case does not necessarily provide proper understanding of the relationship between the two functions as a whole.

Further, when each of $X_{min}$, $X_{max}$, $Y_{min}$ and $Y_{max}$ is set before the graph of the functions is displayed, intersections (−1, −1) and (3, 9) can be easily obtained if the functions are simple like Equations (1) and (2):

$$Y=X^2 \quad (1)$$

$$Y=2X+3 \quad (2)$$

Therefore, $X_{min}$, $X_{max}$, $Y_{min}$ and $Y_{max}$ can be set at appropriate values which allow understanding of the relationship between the two functions as a whole. However, when a graph of a plurality of complicated functions is to be displayed on the calculator, it is difficult to recognize intersections in the graph of the complicated functions, i.e., intersections of lines representing sets of points having values (x, y) defined by the complicated functions as their coordinates and an image of the graph as a whole, and it is therefore difficult to set $X_{min}$, $X_{max}$, $Y_{min}$ and $Y_{max}$ properly.

As a result, when the complicated functions are displayed, $X_{min}$, $X_{max}$, $Y_{min}$ and $Y_{max}$ may provide no display on the display unit. In other words, in this case, the lines representing the points at coordinates defined by the complicated functions are not displayed on the display unit. In this case, the user must set the values $X_{min}$, $X_{max}$, $Y_{min}$ and $Y_{max}$ from the state of no display through repeated trial and error, which has been very inconvenient.

One of conventional techniques for calculators capable of displaying a graph of a function is disclosed in Japanese Unexamined Patent Publication JP-A 62-186347 (1987). The compact electronic calculator having a graph display function in this publication displays a graph on its display unit. To enlarge the graph, the operator presses a tablet overlaid on the display unit such that the locus of points touched with his or her finger forms a closed line. The calculator enlarges the region of the graph which is enclosed by the locus. To reduce the graph, the operator again presses the tablet such that the locus of points touched with his or her finger forms a closed line. The calculator reduces the graph such that the entire graph is displayed inside the region enclosed by the locus in the display unit. Even this calculator may fail to display a line representing points at coordinates defined by the function on the display unit when the graph is initially displayed, depending on the function to be processed. In this case, it is difficult to enlarge or reduce the graph to display the line.

SUMMARY OF THE INVENTION

It is an object of the invention to provide a calculator in which a display range of a graph of a function can be easily set by a user.

In a first aspect of the invention a calculator capable of displaying a graph of a function comprises:

function input means for inputting the function;

display means for displaying a graph of the function inputted by the function input means;

reduction display control means for causing the display means to display the graph of the function on a reduced scale;

display range changing means for changing display ranges for an X-axis and a Y-axis of the reduced graph of the function scaled down by the reduction display means; and graph correcting means for causing the display means to display a graph of the function on the scale before the reduction based on the display ranges changed by the display range changing means.

According to the first aspect of the invention, the calculator can easily change the display ranges of the X-axis and Y-axis of the graph of the function. As a result, the graph of the function can be quickly displayed such that it agrees with an image that the user wishes for the graph to give.

In a second aspect of the invention, a calculator capable of displaying a graph of a function comprises:

function input means for inputting the function;

display means for displaying a graph of the function inputted by the function input means;

reduction display control means for causing the display means to display the graph of the function on a reduced scale;

button display control means for displaying a plurality of display range change instruction buttons for changing display ranges of an X-axis and a Y-axis of the reduced graph of the function;

instruction detecting means for individually detecting whether an instruction has been made on each of the display range change instruction buttons or not;

display range changing means for causing the instruction detecting means to detect whether an instruction has been made on each of the display range change instruction buttons or not and for changing the display ranges in accordance with the display range change instruction button on which an instruction is made; and graph correcting means for causing the display means to display the reduced graph of the function on the scale before the reduction based on the display ranges changed by the display range changing means.

According to the second aspect of the invention, in response to instructions by the user on the display range change instruction buttons, the calculator can easily change the display ranges of the X-axis and Y-axis of the graph of the function. As a result, the graph of the function can be more quickly displayed such that it agrees with an image that the user wishes for the graph to give.

In a third aspect of the invention, each of the display range change instruction buttons of the calculator according to the second aspect respectively correspond to increase in upper limit value of the display range of the X-axis, decrease in upper limit value of the display range of the X-axis, increase in lower limit value of the display range of the X-axis, decrease in lower limit value of the display range of the X-axis, increase in upper limit value of the display range of the X-axis, decrease in upper limit value of the display range of the Y-axis, increase in lower limit value of the display range of the Y-axis and decrease in lower limit value of the display range of the Y-axis; and the display range change instruction buttons are disposed in positions around the reduced graph of the function in accordance with the upper and lower limit values corresponding to the display range change instruction buttons, respectively.

According to the third aspect, each of the display range change instruction buttons has the configuration described above. This allows the operator to easily understand the process corresponding to each of the display range change instruction buttons. Therefore it is extremely easy to change the display ranges of the X-axis and the Y-axis.

In a fourth aspect of the invention, the display range changing means of the calculator according to the third aspect increases the current upper or lower limit value of the display range of the X-axis by a predetermined first value when an instruction is made on the display range change instruction button corresponding to increase in upper or limit value of the X-axis; decreases the current upper or lower limit value of the display range of the X-axis by the predetermined first value when an instruction is made on the display range change instruction button corresponding to decrease in upper or lower limit value of the X-axis; increases the current upper or lower limit value of the display range of the Y-axis by a predetermined second value when an instruction is made on the display range change instruction button corresponding to increase in upper or lower limit value of the Y-axis; and decreases the current upper or lower limit value of the display range of the Y-axis by the predetermined second value when an instruction is made on the display range change instruction button corresponding to decrease in upper or lower limit value of the Y-axis.

According to the fourth aspect, the display range changing means of the calculator operates as described above depending on which of the display range change instruction buttons is operated. As a result, since calculations to be made by the display range changing means are simplified, the display range can be more quickly changed.

In a fifth aspect of the invention, the display range changing means of the calculator according to the second aspect changes the display ranges each time an instruction is made on any one of the display range change instruction buttons, and each time the display ranges are changed, the reduction display control means further causes the display means to display the graph of the function on the same scale as that of the reduced graph of the function based on the changed display ranges.

According to the fifth aspect of the invention, the reduction display instruction means and the display range changing means of the calculator perform the additional above-described operations. This allows the operator to confirm the display ranges each time the display ranges are changed. Further, since the graph of the function based on the changed display ranges is smaller than the graph initially displayed by the display means, the time required to display the graph of the function after an instruction on the display range change instruction buttons can be shortened. It is therefore possible to quickly and reliably change the display ranges.

In a sixth aspect of the invention, the calculator further comprises coordinate detecting means provided so as to overlay the display means, for detecting coordinates of a specified point in the display means, and the instruction detecting means regards each of the display range change buttons displayed in a region including the detected coordinate in the display means as the display range change instruction button on which an instruction has been made.

According to the sixth aspect of the invention, the calculator further comprises the coordinate detecting means. The calculator can increase and decrease the display ranges of the X-axis and the Y-axis, i.e., $X_{min}$, $X_{max}$, $Y_{min}$ and $Y_{max}$ in response to the operator touching a part of the coordinate detecting means located on one of the display range change instruction buttons, for example, with instruction means such as a pen. As a result, the calculator can quickly display a graph of a function that has an image that the user wishes it to give.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
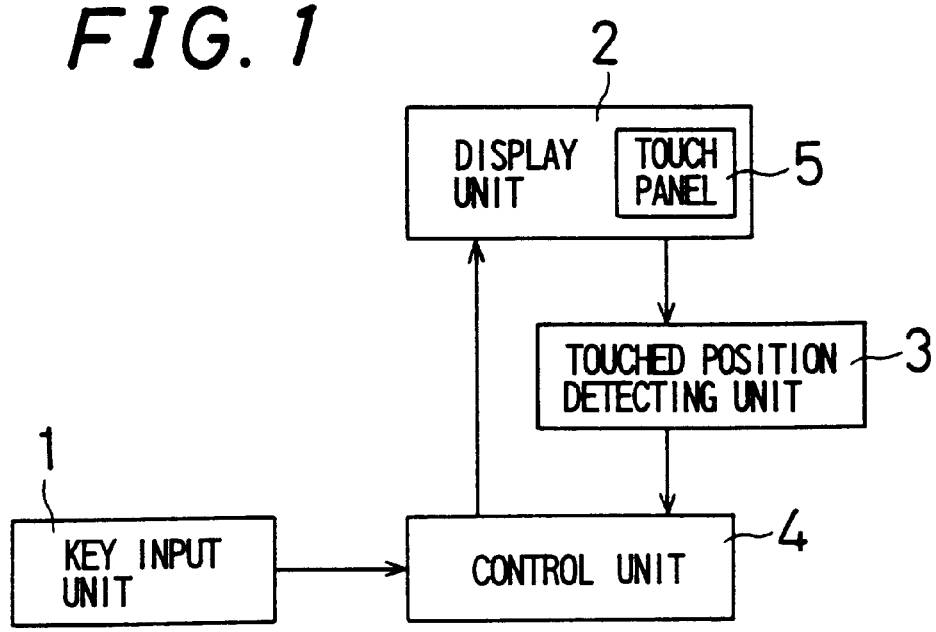
FIG. 1 is a block diagram showing an electrical configuration of a calculator of an embodiment of the present invention.

Now referring to the drawings, preferred embodiments of the invention are described below.

FIG. 1 is a block diagram showing a configuration of a calculator of one embodiment of the invention. The calculator comprises a key input unit 1, a display unit 2, a touched position detecting unit 3, a control unit 4. The calculator is capable of displaying a graph of a function.

The key input unit 1 is comprised of numerical keys such as "1" through "0", symbol keys for inputting various symbols such as "+" and instruction keys for instructing display of a graph and commands. For example, the display unit 2 is constituted by a liquid crystal display having a display screen capable of displaying an image of 96 dots wide by 64 dots high. Further, the display unit 2 includes a transparent touch panel 5 provided in contact with the upper surface of its display screen. The touched position detecting unit 3 detects the X-coordinate and Y-coordinate of the position of a point in the touch panel 5 instructed by a user using instruction means such as a pen. The coordinates correspond to the coordinates of a point in the display screen directly under the position of the point in the touch panel 5. The control unit 4 is comprised of a microprocessor, a ROM, a RAM, a driving circuit for the liquid crystal display, a circuit for interface with the key input unit 1, a circuit for interface with the touched position detecting unit 3, etc. The configuration of each of those parts is not significantly different from conventional configurations.

Figure 2:
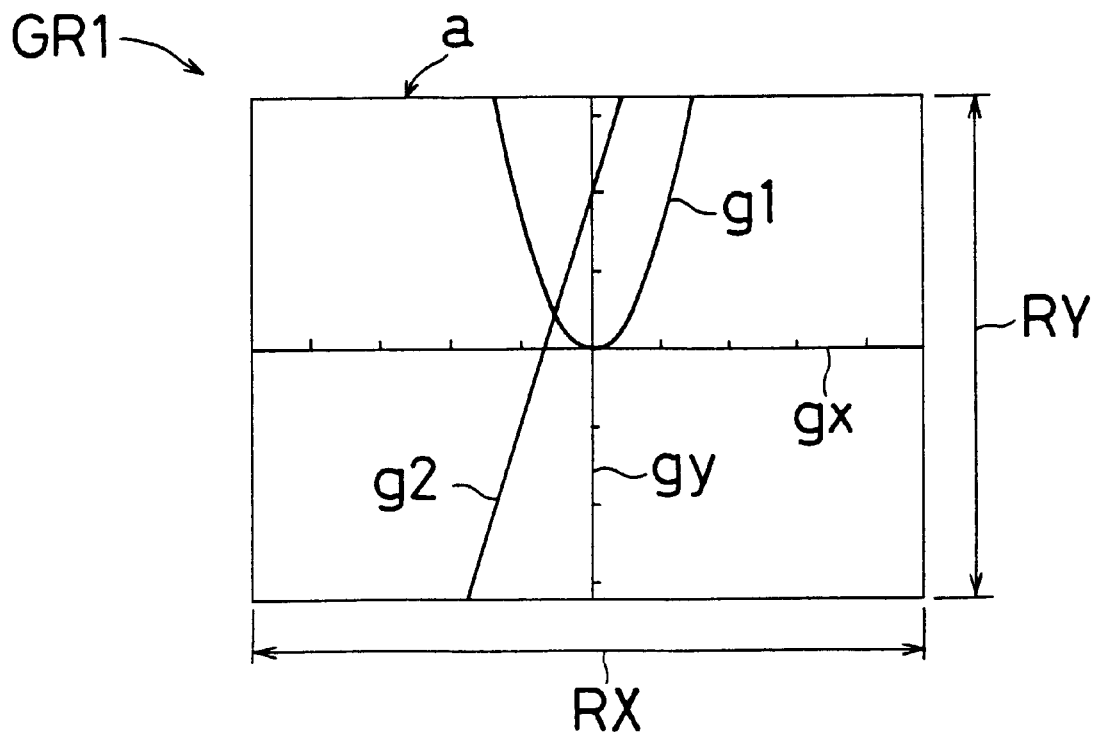
FIG. 2 is a diagram showing an example of a display of a graph before changing a display range of the calculator for graphs of functions.

The calculator for displaying a graph of a function displays a graph as shown in FIG. 2 in the manner described below.

First, the operator of the calculator operates a key for instructing the input of a function on the key input unit 1 and then inputs functions to be processed. Assume that the functions are two functions represented by Equations (3) and (4) in the following description.

$$Y = X^2 \quad (3)$$

$$Y = 2X + 3 \quad (4)$$

Next, the operator operates a key for instructing the display of a graph of the functions on the key input unit 1. As a result, the calculator displays a graph of the functions with the coordinates of the left, right, lower and upper ends represented by $X_{min}$, $X_{max}$, $Y_{min}$ and $Y_{max}$, respectively.

The $X_{min}$ is a lower limit value of a display range RX of the X-axis of the graph of the functions. The $X_{max}$ is an upper limit value of the display range RX of the X-axis. The $Y_{min}$ is a lower limit value of a display range RY of the Y-axis of the graph of the functions. The $Y_{max}$ is an upper limit value of the display range RY of the Y-axis. For $X_{min}$, $X_{max}$, $Y_{min}$ and $Y_{max}$ and numerical values substituted to the variables in Equations (3) and (4), "1" corresponds to 10 dots on the display display ranges of the X-axis and Y-axis correspond to the ranges of sets of points at coordinates defined by the functions, i.e., the range of coordinates (x, y) of the points for determining a part of the graph of the function f(x) to be displayed on the display screen of the display unit 2.

Each of $X_{min}$, $X_{max}$, $Y_{min}$ and $Y_{max}$ can be set by the user before the graph of the functions is displayed. When the user does not set them, a predetermined initial value of each of $X_{min}$, $X_{max}$, $Y_{min}$ and $Y_{max}$ is used. The example in FIG. 2 is an example of a display of the graph of Equations (3) and (4) where $X_{min}=-4.7$; $X_{max}=4.7$; $Y_{min}=-3.1$, and $Y_{max}=3.1$. In the example in FIG. 2, both of an X-axis gx and a Y-axis gy have a scale in one increment. A numerical value "1" corresponds to a length for 10 dots on the display screen. The outer frame of the graph coincides with a frame "a" of the display screen.

The graph in FIG. 2 shows loci g1 and g2 of points (x, y) formed when a variable x moves in domains for Equations (3) and (4), i.e., a graph of Equations (3) and (4) is drawn. Referring to the graph in FIG. 2, the characteristics of the graph can be obtained from the display. However, while the loci of Equations (3) and (4) have two intersections, the graph on FIG. 2 shows only one intersection and does not show the other intersection and hence it can not be regarded as an optimum display that allows a total image of the graph to be properly obtained.

Figure 3:
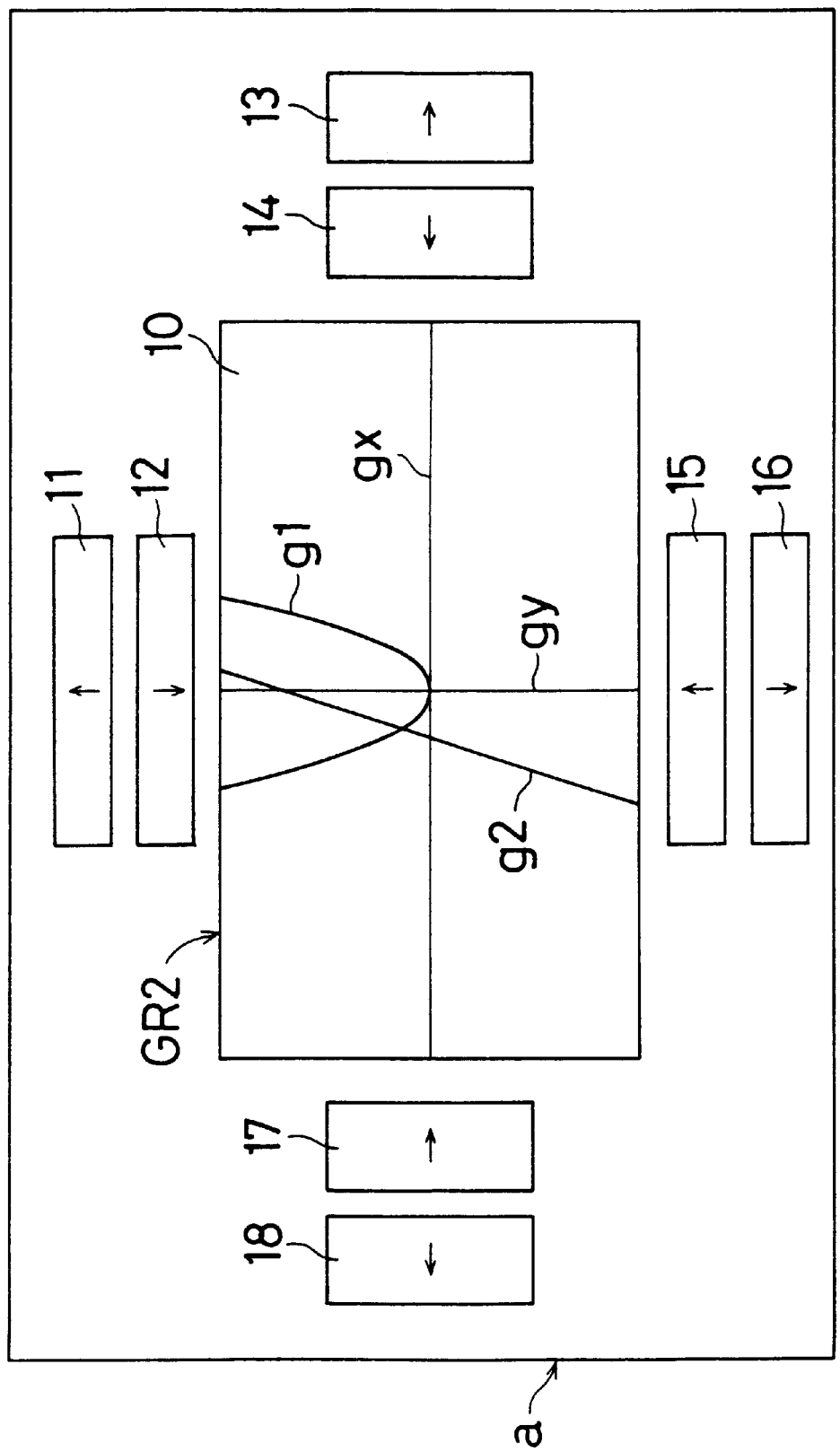
FIG. 3 is a diagram showing an example of a display of graphs of functions and a periphery thereof when the display ranges of the calculator are changed.

When the user operates a key for instructing a reduced display on the key input unit 1 in the state shown in FIG. 2, the display state of the display screen is switched to a state shown in FIG. 3.

The graph GR1 in FIG. 2 is displayed in a region 10 in FIG. 3 on a reduced scale. Assume that the reduced graph GR2 is displayed with vertical and horizontal lengths thereof which is ½ of the vertical and horizontal lengths of the display screen (FIG. 2) respectively and have an area which is one-fourth of the display screen. There is no special need for using the value ½ and the value may be changed depending on the layout of the screen as appropriate. Further, a plurality of buttons 11 through 18 are displayed around the reduced graph. The button 11 is for instructing an increase in the value of $Y_{max}$. The button 12 is for instructing a decrease in the value of $Y_{max}$. The button 13 is for instructing an increase in the value of $X_{max}$. The button 14 is for instructing a decrease in the value of $X_{max}$. Similarly, the button 15 is for instructing an increase in the value of $Y_{min}$. The button 16 is for instructing a decrease in the value of $Y_{min}$. The button 17 is for instructing an increase in the value of $X_{min}$. The button 18 is for instructing a decrease in the value of $X_{min}$.

Figure 4:
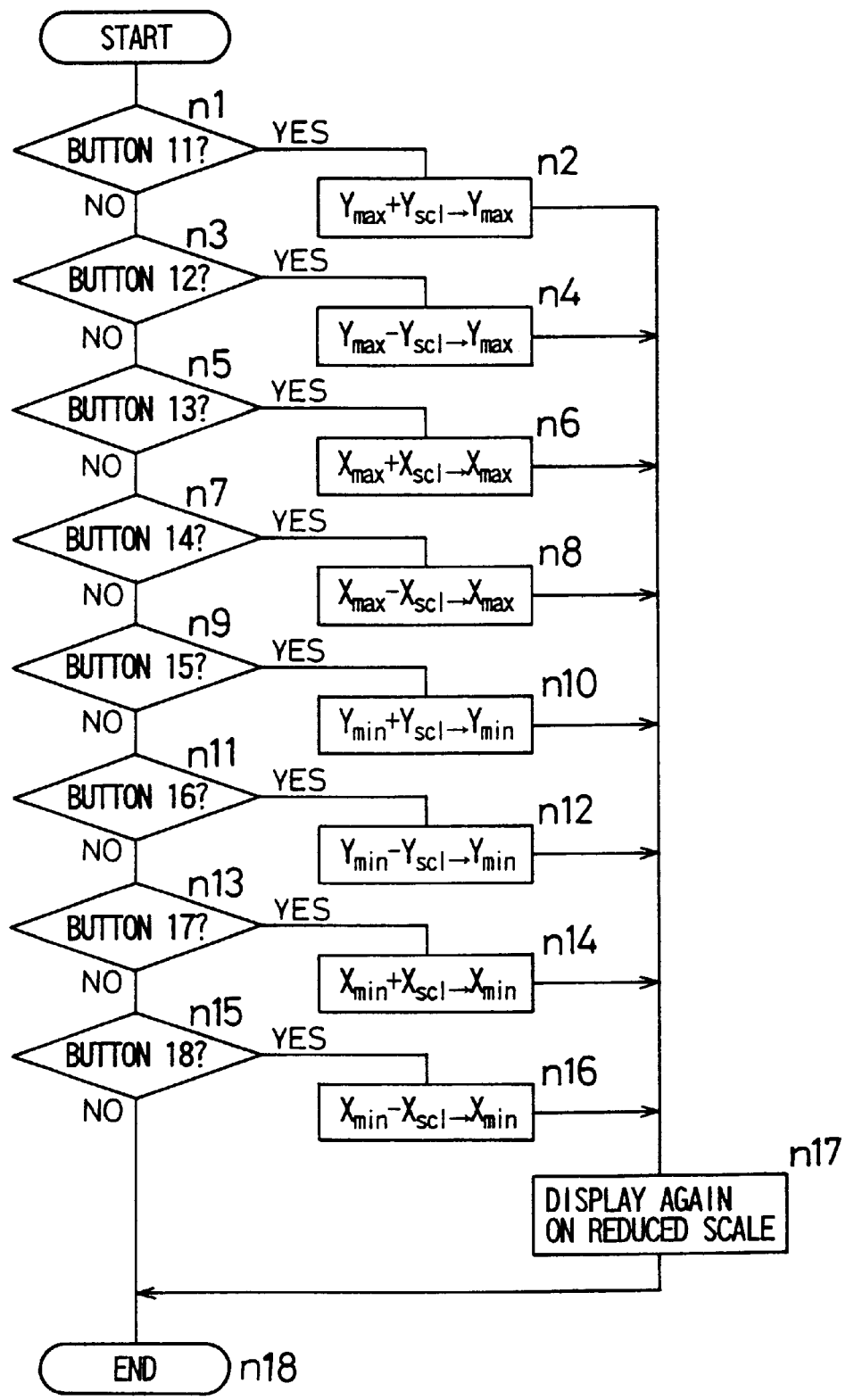
FIG. 4 is a flow chart showing the flow of a process of changing the display ranges of the calculator.

FIG. 4 is a flow chart showing the flow of a process wherein an instruction is made on each of the buttons 11 through 18. $X_{scl}$ in the flow chart is a predetermined value to serve as a unit for the scale on the X-axis and, $Y_{scl}$ is a predetermined value to serve as a unit for the scale on the Y-axis similarly. In this embodiment of the invention, $X_{scl}$ and $Y_{scl}$ are both "1".

When the user touches the touch panel 5 provided on the upper surface of the display unit 2 with a pen or the like, the touched position detecting unit 3 detects the coordinate of the touched position and sends it to the control unit 4. In response to this operation, the process in FIG. 4 is started. At step n1, it is determined whether the coordinate corresponds to the button 11 or not. If there is correspondence, the process proceeds from step n1 to step n2 and, if there is no correspondence, the process proceeds from step n1 to step n3. Similarly, steps n3, n5, n7, n9, n11, n13 and n15 are steps for determining whether the coordinate corresponds to the buttons 12 through 18, respectively. If there is correspondence, the process proceeds from steps n3, n5, n7, n9, n11, n13 and n15 to steps n4, n6, n8, n10, n12, n14 and n16 respectively and, if there is no correspondence, the process proceeds from steps n3, n5, n7, n9, n11, n13 and n15 to steps n5, n7, n9, n11, n13, n15 and n18 respectively.

At step n2, as indicated by Equation (5), the control unit 4 updates $Y_{max}$ by adding $Y_{scl}$ thereto. At step n4, as indicated by Equation (6), the control unit 4 updates $Y_{max}$ by subtracting $Y_{scl}$ therefrom. Similarly, at steps n8, n10, n12, n14 and n16, the control unit 4 carries out calculations indicated by Equations (7) through (12). As a result, the display ranges of the X-axis or Y-axis of the graph of the functions are updated in response to the buttons corresponding to the coordinates, i.e., the buttons on which the user has made an instruction.

$$Y_{max} + Y_{scl} \rightarrow Y_{max} \quad (5)$$

$$Y_{max} - Y_{scl} \rightarrow Y_{max} \quad (6)$$

$$X_{max} + X_{scl} \rightarrow X_{max} \quad (7)$$

$$X_{max} - X_{scl} \rightarrow X_{max} \quad (8)$$

$$Y_{min} + Y_{scl} \rightarrow Y_{min} \quad (9)$$

$$Y_{min} - Y_{scl} \rightarrow Y_{min} \quad (10)$$

$$X_{min} + X_{scl} \rightarrow X_{min} \quad (11)$$

$$X_{min} - X_{scl} \rightarrow X_{min} \quad (12)$$

When the processes at steps n2, n4, n6, n8, n10, n12, n14 and n16 are completed, the process proceeds to step n17 where the control unit 4 displays the graph of the functions again on the same scale as the graph GR2 in FIG. 3 based on the updated display range. After the second display, the process of the flow chart in FIG. 4 terminates at step n18. When the coordinate does not correspond to any of the buttons 11 through 18, the process directly proceeds from step n15 to step n18 to terminate the process of the flow chart in FIG. 4.

For example, when the control unit 4 determines that the coordinate corresponds to the button 11 (step n1), $Y_{scl}$ is added to $Y_{max}$ (step n2). In the case in FIG. 3, since the initial values $X_{min}$=-4.7; $X_{max}$=4.7; $Y_{min}$=-3.1; and $Y_{max}$=3.1, $Y_{max}$ is added with $Y_{scl}$ to obtain 3.1+1=4.1. The graph that resides in the region 10 in FIG. 1 is displayed again based on this newly determined value (step n17). When the user touches the button 11 again in this state, the processes at steps n1, n2 and n17 are performed again and therefore $Y_{max}$ becomes 5.1.

Similarly, when the user touches the button 12 (step n3), $Y_{scl}$ is subtracted from $Y_{max}$ (step n4). In this example, $Y_{max}$ becomes 3.1-1=2.1. When an instruction is made on the buttons 13 through 18, a similar process is performed respectively (steps n5 through n16) to provide a second display (step n17).

Figure 5:
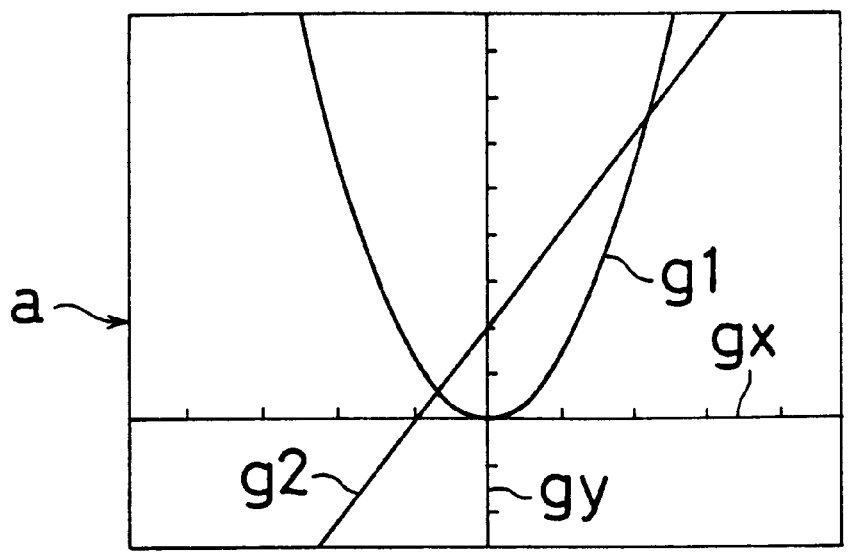
FIG. 5 is a diagram showing an example of a display of a graph after changing the display ranges of the calculator.

The user confirms the second display of the graph of the functions and presses a key for instructing display of the graph on the key input unit 1 when the graph enters into a desired state of display. In response to this, the calculator returns the graph GR3 displayed again as shown in the display of the graph in FIG. 5 to the same scale as that of the display of the graph in FIG. 2. Such a process allows the user to easily cause the calculator to display the graph in a desired range.

As described above, when a graph of functions is displayed on the calculator, the user can quickly cause a display of a proper graph by making instructions on the buttons provided around a reduction-displayed graph while checking the reduced display.

Further, when the display range is changed, since the region 10 for displaying the reduced graph is a region having an area which is one-fourth of that of the display screen, the time required for displaying the graph again after the instructions using the buttons can be reduced to allow the display range to be changed quickly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A calculator capable of displaying a graph of a function comprising:

function input means for inputting the function;

display means for displaying a graph of the function inputted by the function input means on a first scale in a first display region having a first area;

reduction display control means for causing the display means to display the graph of the function on a second scale in a second display region having a second area, wherein said second scale is reduced relative to said first scale and said second area of said second display region is less than said first area of said first display region;

display range changing means for changing display ranges for an X-axis and a Y-axis of the reduced graph of the function scaled down by the reduction display means, while the reduced graph of the function is being displayed in said second display region so that different portions of the function may be displayed in reduced form in said second display region over time as said display ranges are changed by said display range changing means; and graph correcting means for causing the display means to display a graph of the function on the first scale based on the display ranges as changed by the display range changing means.

2. A calculator capable of displaying a graph of a function comprising:

function input means for inputting the function;

display means for displaying a graph of the function inputted by the function input means;

reduction display control means for causing the display means to display the graph of the function on a reduced scale;

button display control means for displaying a plurality of display range change instruction buttons for changing display ranges of an X-axis and a Y-axis of the reduced graph of the function;

instruction detecting means for individually detecting whether an instruction has been made on each of the display range change instruction buttons or not;

display range changing means for causing the instruction detecting means to detect whether an instruction has been made on each of the display range change instruction buttons or not and for changing the display ranges in accordance with the display range change instruction button on which an instruction is made; and graph correcting means for causing the display means to display the reduced graph of the function on the scale before the reduction based on the display ranges changed by the display range changing means.

3. The calculator of claim 2, wherein the display range change instruction buttons respectively correspond to increasing an upper limit value of the display range of the X-axis, decreasing an upper limit value of the display range of the X-axis, increasing a lower limit value of the display range of the X-axis, decreasing a lower limit value of the display range of the X-axis, increasing an upper limit value of the display range of the Y-axis, decreasing an upper limit value of the display range of the Y-axis, increasing a lower limit value of the display range of the Y-axis and decreasing a lower limit value of the display range of the Y-axis; and the display range change instruction buttons are disposed in positions around the reduced graph of the function in accordance with the upper or lower limit values corresponding to the respective display range change instruction buttons.

4. The calculator of claim 3, wherein the display range changing means:

increases the current upper or lower limit value of the display range of the X-axis by a predetermined first value when an instruction is made on the display range change instruction button corresponding to increase in upper or lower limit value of the X-axis;

decreases the current upper or lower limit value of the display range of the X-axis by the predetermined first value when an instruction is made on the display range change instruction button corresponding to decrease in upper or lower limit value of the X-axis;

increases the current upper or lower limit value of the display range of the Y-axis by a predetermined second value when an instruction is made on the display range change instruction button corresponding to increase in upper or lower limit value of the Y-axis; and decreases the current upper or lower limit value of the display range of the Y-axis by the predetermined second value when an instruction is made on the display range change button corresponding to decrease in upper or limit value of the Y-axis.

5. The calculator of claim 2, wherein the display range changing means changes the display ranges each time an instruction is made on any one of the display range change instruction buttons, and each time the display ranges are changed, the reduction display control means further causes the display means to display the graph of the function on the same scale as that of the reduced graph of the function based on the changed display ranges.

6. The calculator of claim 2, further comprising coordinate detecting means provided so as to overlay the display means, for detecting coordinates of a specified point in the display means, and the instruction detecting means regards each of the display range change buttons displayed in a region including the detected coordinate in the display means as the display range change instruction button on which an instruction has been made.

7. The calculator of claim 1, wherein said second display region is located within said first display region.

8. A method of displaying different portions of a graph of a function on a calculator, the method comprising the steps of:

inputting the function;

displaying a graph of the input function on a first scale in a first display region;

displaying the graph of the function in a reduced graph form on a second scale in a second display region, wherein the second scale is reduced relative to the first scale;

changing display ranges for at least one of an X-axis and a Y-axis of the reduced graph of the function while the reduced graph of the function is being displayed in the second display region on the second scale so that different portions of the function are displayed in reduced form in the second display region over time as the display ranges are changed; and causing the display means to display a graph of the function on the first scale based upon changes to the display ranges made in said changing step.

9. A method of displaying a graph of a function on a calculator comprising the steps of:

inputting the function;

displaying a graph of the input function in a display area;

displaying the graph of the function on a reduced scale;

displaying a plurality of display range change instruction buttons in the display area for changing display ranges of an X-axis and Y-axis of the reduced graph of the function;

detecting whether an instruction has been made to each of the display range change instruction buttons;

changing the display ranges in accordance with inputs to the display range change instruction buttons; and displaying a graph of the function on the scale before the reduction based upon display range changes performed in said changing step.

* * * * *